(12) United States Patent
Sakamoto et al.

(10) Patent No.: US 11,753,130 B2
(45) Date of Patent: Sep. 12, 2023

(54) MARINE HYBRID SYSTEM AND CONTROL METHOD FOR MARINE HYBRID SYSTEM (71) Applicant: MITSUBISHI HEAVY INDUSTRIES ENGINE & TURBOCHARGER, LTD., Sagamihara (JP)

(72) Inventors: Kohei Sakamoto, Sagamihara (JP); Yoshimi Okazaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 249 days.

(21) Appl. No.: 17/283,113

(22) PCT Filed: Aug. 28, 2019

(86) PCT No.: PCT/JP2019/033773
§ 371 (c)(1),
(2) Date: Apr. 6, 2021

(87) PCT Pub. No.: WO2020/075408
PCT Pub. Date: Apr. 16, 2020

(65) Prior Publication Data
US 2021/0387709 A1    Dec. 16, 2021

(30) Foreign Application Priority Data
Oct. 10, 2018 (JP) ................... 2018-192051

(51) Int. Cl.
*B63H 21/20* (2006.01)
*B63H 21/14* (2006.01)
(Continued)

(52) U.S. Cl.
CPC ............ *B63H 21/20* (2013.01); *B63H 21/14* (2013.01); *B63H 21/17* (2013.01); *B63H 21/21* (2013.01); *B63H 2021/202* (2013.01)

(58) Field of Classification Search
CPC ........ B63H 21/20; B63H 21/14; B63H 21/17; B63H 21/21; B63H 2021/202
See application file for complete search history.

(56) References Cited

U.S. PATENT DOCUMENTS 5,537,886 A * 7/1996 Toyama ............. F16H 61/0246
74/336 R
6,487,923 B1    12/2002 Hunold
(Continued)

FOREIGN PATENT DOCUMENTS

CN        1313820 A    9/2001
CN      203372386 U    1/2014
(Continued)

OTHER PUBLICATIONS

International Preliminary Report on Patentability and Written Opinion of the International Searching Authority for International Application No. PCT/JP2019/033773, dated Apr. 22, 2021, with English translation of the Written Opinion.
(Continued)

*Primary Examiner* — Stephen P Avila
(74) *Attorney, Agent, or Firm* — Birch, Stewart, Kolasch & Birch, LLP (57) ABSTRACT

In a marine hybrid system which includes an engine, an electric motor, a thrust generation device, and a clutch mechanism configured to be able to switch connection states therebetween, if it is determined that the engine is in an overload condition, the clutch mechanism is controlled such that a load of the engine is reduced.

9 Claims, 6 Drawing Sheets

(51) Int. Cl.
*B63H 21/17* (2006.01)
*B63H 21/21* (2006.01)

(56) References Cited

U.S. PATENT DOCUMENTS

| | | | |
|---|---|---|---|
| 9,404,413 | B2 | 8/2016 | Schmalzing et al. |
| 2010/0105259 | A1 | 4/2010 | Wejrzanowski et al. |
| 2011/0237141 | A1* | 9/2011 | Tamba .................. B63H 23/16 |
| | | | 290/47 |
| 2012/0028515 | A1 | 2/2012 | Stasolla et al. |
| 2012/0083173 | A1 | 4/2012 | McMillan |
| 2012/0309242 | A1 | 12/2012 | Haugland |
| 2014/0324256 | A1 | 10/2014 | Aschaber |

FOREIGN PATENT DOCUMENTS

| | | |
|---|---|---|
| CN | 106828854 A | 6/2017 |
| EP | 1 897 801 B1 | 12/2017 |
| JP | 2004-257294 A | 9/2004 |
| JP | 2005-210873 A | 8/2005 |
| JP | 2013-147186 A | 8/2013 |

OTHER PUBLICATIONS

International Search Report for International Application No. PCT/JP2019/033773, dated Nov. 5, 2019.
Extended European Search Report for European Application No. 19870475.1, dated Nov. 10, 2021.
Wartsila, "Marine Propulsion 2 Speed Gear in Combination with CCP," Wartsila.com, May 19, 2014, pp. 1-4.
Office Action dated Jan. 19, 2023 issued in counterpart Chinese Application No. 201980063508.7.

* cited by examiner

| | Operation mode | First clutch | Second clutch | Third clutch | Engine | Electric motor |
|---|---|---|---|---|---|---|
| a | Engine drive mode | Connected | Connected | Disconnected | Driven | Stopped |
| b | Motor drive mode | Connected | Disconnected | Connected | Stopped | Power-driven |
| c | Motor assist mode | Connected | Connected | Connected | Driven | Power-driven |
| d | Sailing power generation mode | Connected | Connected | Connected | Stopped | Regeneratively driven |
| e | Stop power generation mode | Disconnected | Connected | Connected | Driven | Regeneratively driven |

MARINE HYBRID SYSTEM AND CONTROL METHOD FOR MARINE HYBRID SYSTEM

TECHNICAL FIELD

The present disclosure relates to a marine hybrid system that can be equipped with a hybrid propulsion ship including an engine and an electric motor as power sources, and a control method for the marine hybrid system.

BACKGROUND

In a ship sailing on water, a thrust for sailing is obtained by driving a thrust generation device such as a propeller by a power source. Conventionally, an engine which is an internal combustion engine consuming a fossil fuel has mainly been used as the power source. Recently, however, in order to reduce a fuel consumption amount and an environmental load, development of a so-called hybrid propulsion ship is advanced which includes, in addition to the conventional engine, an electric motor (electric motor drive) that can be driven by using electric energy stored in a battery or the like.

In the hybrid propulsion ship, individually controlling the two power sources, that is, the engine and the electric motor, an operation is performed while selectively controlling a plurality of operation modes in accordance with sailing conditions. For example, Patent Document 1 discloses an example of the hybrid propulsion ship. In the above ship, it is possible to select an engine drive mode in which a thrust is obtained by driving only the engine, a motor drive mode in which a thrust is obtained by driving only the electric motor, and a motor assist mode in which a thrust is obtained by driving both of the engine and the electric motor.

CITATION LIST

Patent Literature

Patent Document 1: JP2013-147186A

SUMMARY

Technical Problem

As an engine used in a ship, a mechanical engine prevails which can adjust an output obtained by control of a rotations peed, by manually performing a throttle operation by an operator. The mechanical engine is operated by, for example, grasping a rotation speed-output characteristics of the engine in advance, and controlling the rotation speed by the throttle operation in consideration of a wind direction and a tide. Also in a hybrid ship including an engine and an electric motor as power sources, a mechanical engine is often used as the engine, like the conventional ship. However, in the hybrid ship, with the two power sources, that is, the engine and the electric motor, the operator is required of not only the throttle operation of the engine but also selection of the operation mode as in Patent Document 1 above. That is, in the hybrid ship, although good fuel economy performance is advantageously obtained by switching the operation modes while combining the engine and the electric motor in accordance with the sailing condition, it is difficult to perform engine control by the throttle operation while appropriately switching the operation modes with the mechanical engine, and the fuel economy performance by hybrid may not sufficiently be delivered.

Moreover, in the hybrid propulsion ship, in addition to the three operation modes described in Patent Document 1, for example, a sailing power generation mode in which power is generated by the electric motor with a part of power of the engine while obtaining a thrust by driving the engine, and a stop power generation mode in which power is generated by driving the electric motor with the power of the engine while the ship is stopped are considered. In these operation modes, electric energy can be supplied by regeneratively driving the electric motor, which is effective in improving energy efficiency of the ship. However, in the sailing power generation mode, if a power generation load of the electric motor increases, the engine may be brought into an overload condition depending on a sailing condition. Bringing the engine into the overload condition, various defects such as excessive wear, oil deterioration, and seizure are carried, and a failure may be caused if the defects further advance.

At least one embodiment of the present invention is made in view of the above, and an object of the present invention is to provide a marine hybrid system capable of appropriately performing drive control of the engine and the electric motor in accordance with the sailing condition while preventing the engine from being brought into the overload condition, and a control method for the marine hybrid system.

Solution to Problem (1) In order to solve the above-described problems, a marine hybrid system according to at least one embodiment of the present invention includes an engine, an electric motor, a thrust generation device capable of generating a thrust of a ship by using an output of at least one of the engine or the electric motor, a clutch mechanism configured to be able to switch connection states between the engine, the electric motor, and the thrust generation device, an overload determination part for determining whether the engine is in an overload condition, and a control device for controlling a connection state of the clutch mechanism. The control device controls the clutch mechanism such that a load of the engine is reduced, if the overload determination part determines that the engine is in the overload condition.

With the above configuration (1), controlling the clutch mechanism such that the load of the engine is reduced, if it is determined that the engine is in the overload condition, it is possible to adequately preventing the engine from being brought into the overload condition. As a result, it is possible to implement the marine hybrid system capable of stable operation with high reliability.

(2) In some embodiments, in the above configuration (1), the overload determination part determines whether the engine is in the overload condition in a sailing power generation mode where power is generated by the electric motor during sailing by supplying the output of the engine to the thrust generation device and the electric motor.

With the above configuration (2), controlling the clutch mechanism such that the load is reduced when the engine is brought into the overload condition in the sailing power generation mode where the output of the engine is used not only for a thrust force for sailing but also for power generation of the electric motor, it is possible to adequately prevent the engine from being brought into the overload condition.

(3) In some embodiments, in the above configuration (1) or (2), the clutch mechanism includes a first clutch disposed between the thrust generation device and an intermediate shaft, second clutches disposed between the intermediate shaft and the engine, and a third clutch disposed between the intermediate shaft and the drive motor, the second clutches are disposed in parallel, and include a power transmission path including a first path and a second path different from each other in transmission ratio, and the control device is configured to be able to adjust the load of the engine by alternatively switching the first path or the second path, if the second clutches are connected.

With the above configuration (3), the power transmission path connected to the engine includes the first path and the second path. The first path and the second path are configured to be different from each other in transmission ratio, and are switched if the overload condition is determined, making it possible to reduce the load of the engine.

(4) In some embodiments, in the above configuration (3), the second path is set to have the transmission ratio lower than that of the first path, and the control device controls the clutch mechanism such that the power transmission path of the second clutches is switched from the first path to the second path, if the overload determination part determines that the internal combustion engine is in the overload condition.

With the above configuration (4), if the overload condition is determined, in the second clutches, the power transmission path is switched from the first path having the higher transmission ratio to the second path having the lower transmission ratio, making it possible to reduce the load of the engine.

(5) In some embodiments, in any one of the above configurations (1) to (4), the ship has a plurality of operation modes, the plurality of operation modes include an engine drive mode in which the ship sails by power of the engine, a motor drive mode in which the ship sails by power of the electric motor, a motor assist mode in which the ship sails by power of both of the engine and the electric motor, a sailing power generation mode in which power is generated by the electric motor while the ship sails by the power of the engine, and a stop power generation mode in which power is generated by the electric motor while the thrust power generation device is stopped, and the control device controls the clutch mechanism such that the load of the engine is reduced, if the overload determination part determines that the engine is in the overload condition, in the sailing power generation mode of the operation modes.

With the above configuration (5), the ship has the engine drive mode, the motor drive mode, the motor assist mode, the sailing power generation mode, and the stop power generation mode. Then, if the engine is brought into the overload condition by an increase in load needed for regenerative drive of the electric motor in the sailing power generation mode of these five operation modes, controlling the clutch mechanism such that the load of the engine is reduced as described above, it is possible to adequately prevent the engine from being brought into the overload condition.

(6) In some embodiments, in the above configuration (5), the marine hybrid system further includes a storage device for storing an output characteristic curve defining a relationship between a rotation speed and an output of the thrust generation device in each of the plurality of operation modes, and fuel-efficiency map data of the engine, a target output calculation part for calculating a target output of the thrust generation device, and an operation mode selection part for calculating, based on the output characteristic curve and fuel map data, a fuel consumption rate in each of the operation modes corresponding to the target output, and selecting, based on the fuel consumption rate in each of the operation modes, the operation mode to be implemented.

With the above configuration (6), based on the output characteristic curve and the fuel-efficiency map data pre-stored in the storage device, a fuel consumption rate in each operation mode relative to the target output of the ship is calculated. Then, comparing the fuel consumption rates assumed in the respective operation modes, it is possible to implement efficient sailing while selecting the optimum operation mode. In particular, if the fuel consumption rate is given priority, performing the above-described control, it is possible to switch the operation modes so that the optimum fuel consumption rate is obtained.

(7) In some embodiments, in any one of the above configurations (1) to (6), the engine is a mechanical engine capable of controlling a rotation speed by a throttle operation of an operator.

With the above configuration (7), also in the mechanical engine capable of controlling the rotation speed by the throttle operation of the operator, preventing the engine from being brought into the overload condition, stable operation is enabled at high reliability.

(8) In order to solve the above-described problems, a control method for a marine hybrid system, which includes an engine, an electric motor, a thrust generation device capable of generating a thrust of a ship by using an output of at least one of the engine or the electric motor, and a clutch mechanism configured to be able to switch connection states between the engine, the electric motor, and the thrust generation device, according to at least one embodiment of the present invention, includes an overload determination step of determining whether the engine is in an overload condition, and a control step of controlling the clutch mechanism such that a load of the engine is reduced, if it is determined that the engine is in the overload condition.

With the above method (8), controlling the clutch mechanism such that the load of the engine is reduced, if it is determined that the engine is in the overload condition, it is possible to adequately prevent the engine from being brought into the overload condition. As a result, it is possible to implement the marine hybrid system capable of stable operation with high reliability.

(9) In some embodiments, in the above method (8), the control step includes determining whether the engine is in the overload condition in a sailing power generation mode where power is generated by the electric motor during sailing by supplying the output of the engine to the thrust generation device and the electric motor.

With the above method (9), controlling the clutch mechanism such that the load is reduced when the engine is brought into the overload condition in the sailing power generation mode where the output of the engine is used not only for a thrust force for sailing but also for power generation of the electric motor, it is possible to adequately prevent the engine from being brought into the overload condition.

Advantageous Effects

According to at least one embodiment of the present invention, it is possible to provide a marine hybrid system capable of appropriately performing drive control of an engine and an electric motor in accordance with a sailing condition while preventing the engine from being brought into an overload condition, and a control method for the marine hybrid system.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Figure 1:
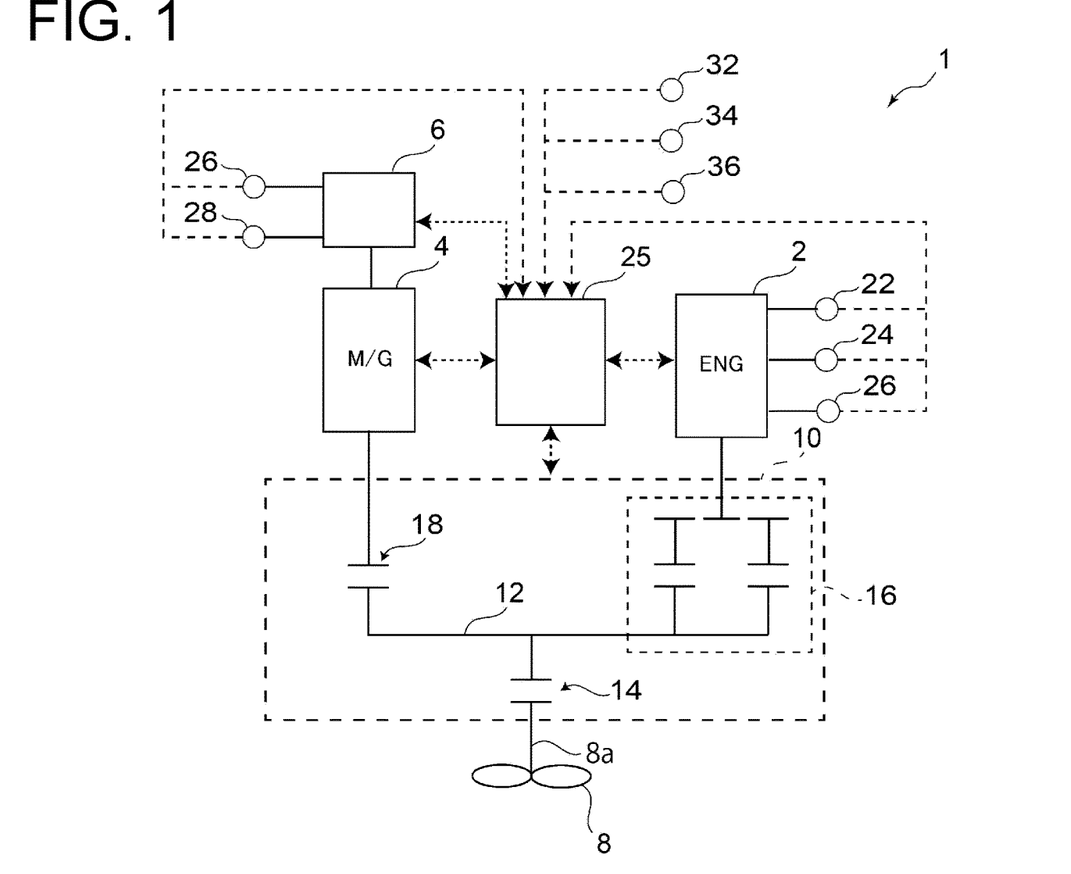
FIG. 1 is an overall configuration diagram of a marine hybrid system according to at least one embodiment of the present invention.

FIG. 1 is an overall configuration diagram of a marine hybrid system 1 according to at least one embodiment of the present invention. The marine hybrid system 1 includes an engine 2 and an electric motor 4 as power sources of a ship sailing on water. The engine 2 is an internal combustion engine capable of outputting power by consuming a fossil fuel. The electric motor 4 is an electric motor drive capable of outputting power by being driven (power-driven) by power (electric energy) stored in a battery 6 mounted on the ship. Moreover, the electric motor 4 can function as a generator by being mechanically driven (regeneratively driven) from outside. In this case, power generated by the electric motor 4 is stored in the battery 6.

Although not shown in FIG. 1, various power conversion elements such as an inverter and a converter may be disposed on an electric path between the electric motor 4 and the battery 6.

A thrust generation device 8 is a device for generating a thrust for sailing of the ship by being driven by power output from at least one of the engine 2 or the electric motor 4. The thrust generation device 8 is, for example, a propeller.

The thrust generation device 8 is connected to the engine 2 and the electric motor 4 via a clutch mechanism 10. Thus, in accordance with a connection state of the clutch mechanism 10, at least one of the engine 2 or the electric motor 4 is connected to the thrust generation device 8 in terms of power. As a result, the ship obtains the thrust by driving the thrust generation device 8 by using the output of at least one of the engine 2 or the electric motor 4.

The clutch mechanism 10 is configured to be able to switch connection states between the engine 2, the electric motor 4, and the thrust generation device 8. As shown in FIG. 1, the clutch mechanism 10 includes a first clutch 14 configured to be able to disconnect an intermediate shaft 12 and an input shaft 8a of the thrust generation device 8, second clutches 16 configured to be able to disconnect the intermediate shaft 12 and the engine 2, and a third clutch 18 configured to be able to disconnect the intermediate shaft 12 and the electric motor 4. The above-described first clutch 14, second clutches 16 and third clutch 18 are configured to be able to connect/disconnect the engine 2, the electric motor 4, and the thrust generation device 8 in terms of power, by switching respective connection states.

Figure 2:
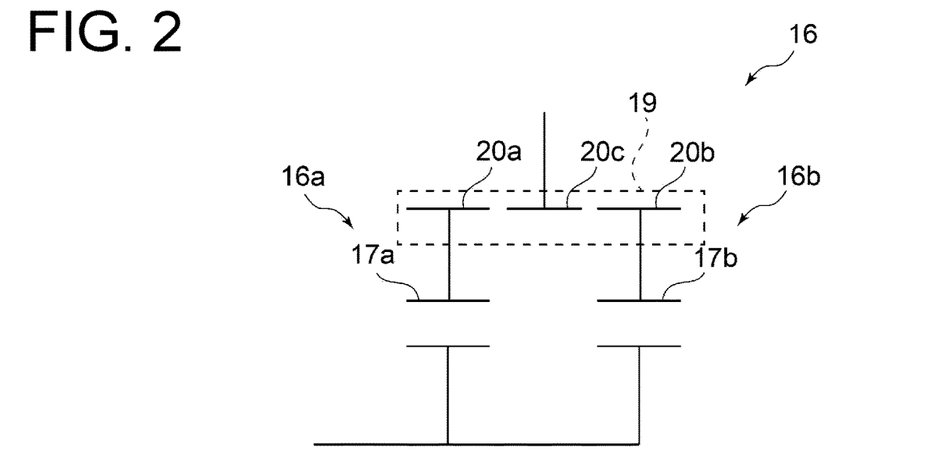
FIG. 2 is a detailed diagram of second clutches in FIG. 1.

FIG. 2 is a detailed diagram of the second clutches 16 in FIG. 1. As shown in FIG. 2, the second clutches 16 disposed between the engine 2 and the intermediate shaft 12 include a first path 16a and a second path 16b disposed in parallel. The first path 16a and the second path 16b include a first subclutch 17a and a second subclutch 17b, respectively, and are configured to be independently connectable.

The first path 16a and the second path 16b include a transmission mechanism 19 on a side of the engine 2. The transmission mechanism 19 includes a first gear 20a disposed at an end of the first path 16a, a second gear 20b disposed at an end of the second path 16b, and a third gear 20c disposed on the side of an output shaft of the engine 2. The first gear 20a, the second gear 20b, and the third gear 20c are set to each have a predetermined transmission ratio when power is transmitted in the first path 16a and the second path 16b.

The first gear 20a, the second gear 20b, and the third gear 20c are set to have different transmission ratios in the first path 16a and the second path 16b. In the present embodiment, the second path 16b is set to have a lower transmission ratio than that of the first path 16a (in other words, the first path 16a has a low gear, and the second path 16b has a high gear).

In a case in which the second clutches 16 are switched into a connected state by a control device 25 to be described later, control is performed such that the first path 16a is selected first as default (the first subclutch 17a enters a connected state, and the second subclutch 17b enters a disconnected state), and if a predetermined condition is satisfied (step S7 in FIG. 5 to be described later: YES), the second path 16b is selected (the first subclutch 17a enters the disconnected state, and the second subclutch 17b enters the connected state).

Referring back to FIG. 1, the marine hybrid system 1 includes the control device 25. The control device 25 is configured as a control unit for the marine hybrid system 1 by including hardware constituted by an electronic computation device such as a computer and installing, on the hardware, a program for performing the control method for the marine hybrid system 1 according to at least one embodiment of the present invention. The program can be installed by reading, for example, a program stored in a predetermined storage medium with a reading device of the hardware, and the program and the storage medium storing the program also fall within the technical scope of the present invention.

The control device 25 controls the marine hybrid system 1 by transmitting/receiving various control signals to the respective constituent elements of the marine hybrid system 1.

In FIG. 1, flows of the control signals are representatively indicated by dashed lines, respectively, in a range necessary for the following description.

Figure 3:
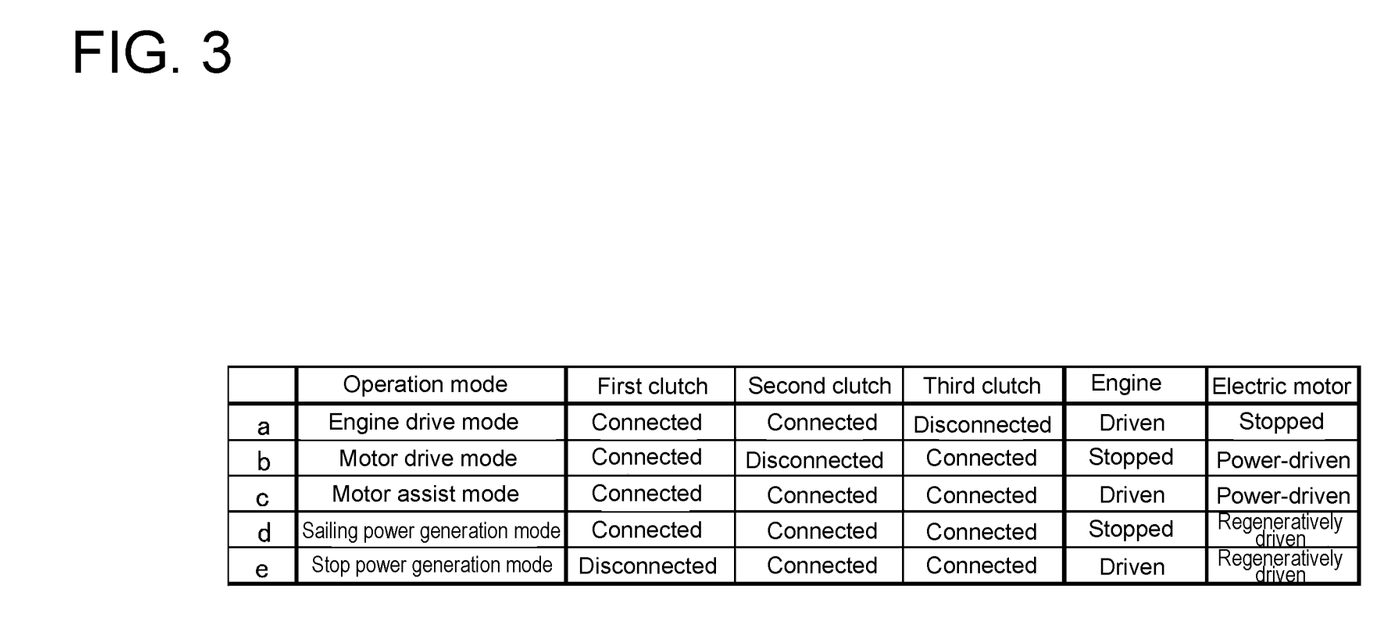
FIG. 3 is a list showing connection states of a first clutch, the second clutches, and a third clutch, and drive states of an engine and an electric motor in respective operation modes.

In the present embodiment, the control device 25 causes the engine 2, the electric motor 4, and the clutch mechanism 10 to cooperate each other, thereby configuring such that five operation modes can be performed. The five operation modes include an engine drive mode, a motor drive mode, a motor assist mode, a sailing power generation mode, and a stop power generation mode. FIG. 3 is a list showing connection states of the first clutch 14, the second clutches 16, and the third clutch 18, and drive states of the engine 2 and the electric motor 4 in the respective operation modes.

The engine drive mode is the operation mode in which the thrust for sailing is generated by driving the thrust generation device 8 only by the engine 2. At this time, as shown in (a) of FIG. 3, the first clutch 14 and the second clutches 16 are set in the connected state, and the third clutch is set in the disconnected state. Thus, the engine 2 and the thrust generation device 8 are connected in terms of power, and the electric motor 4 is disconnected in terms of power from the engine 2 and the thrust generation device 8. Then, power output from the engine 2 serving as the power source is transmitted to the thrust generation device 8 via the clutch mechanism 10, obtaining a thrust force of the ship. At this time, the electric motor 4 is in a stopped state (disconnected in terms of power, the electric motor 4 may be driven; however, the electric motor 4 is preferably in the stopped state in order to avoid wasteful electric power consumption).

The motor drive mode is the operation mode in which the thrust for sailing is generated by driving the thrust generation device 8 only by the electric motor 4. At this time, as shown in (b) of FIG. 3, the first clutch 14 and the third clutch 18 are set in the connected state, and the second clutches 16 are set in the disconnected state. Thus, the electric motor 4 and the thrust generation device 8 are connected in terms of power, and the engine 2 is disconnected in terms of power from the electric motor 4 and the thrust generation device 8. Then, power output from the electric motor 4 serving as the power source is transmitted to the thrust generation device 8 via the clutch mechanism 10, obtaining a thrust force of the ship. At this time, the engine 2 is in the stopped state (disconnected in terms of power, the engine 2 may be driven; however, the engine 2 is preferably in the stopped state in order to avoid wasteful fuel consumption).

The motor assist mode is the operation mode in which the thrust for sailing is generated by driving the thrust generation device 8 by both of the engine 2 and the electric motor 4. At this time, as shown in (c) of FIG. 3, the first clutch 14, the second clutches 16, and the third clutch 18 are all set in the connected state. Thus, the engine 2, the electric motor 4, and the thrust generation device 8 are connected to each other in terms of power. Then, power output from the engine 2 and the electric motor 4 each serving as the power source is transmitted to the thrust generation device 8 via the clutch mechanism 10, obtaining a thrust force of the ship.

The sailing power generation mode is the operation mode in which the thrust for sailing is generated by the output of the engine 2 supplied to the electric motor 4 and the thrust generation device 8, and power is generated by regeneratively driving the electric motor 4 by using a part of the output of the engine 2. At this time, as shown in (d) of FIG. 3, the first clutch 14, the second clutches 16, and the third clutch 18 are all set in the connected state. Thus, the engine 2, the electric motor 4, and the thrust generation device 8 are connected to each other in terms of power. Then, the power output from the engine 2 serving as the power source is transmitted to the electric motor 4 and the thrust generation device 8 via the clutch mechanism 10. Thus, a thrust force of the ship is obtained in the thrust generation device 8, and power is generated by regeneratively driving the electric motor 4. At this time, the power generated in the electric motor 4 may be stored in the battery 6 or may directly be supplied to an inboard load.

The stop power generation mode is the operation mode in which power is generated by supplying the output of the engine 2 to the electric motor 4, thereby regeneratively driving the electric motor 4 by the output of the engine 2 in the ship in the stopped state. At this time, as shown in (e) of FIG. 3, the second clutches 16 and the third clutch 18 are set in the connected state, and the first clutch 14 is set in the disconnected state. Thus, the engine 2 and the electric motor 4 are connected to each other in terms of power. Then, the power output from the engine 2 serving as the power source is transmitted to the electric motor 4 via the clutch mechanism 10, without being transmitted to the thrust generation device 8. Thus, the electric motor 4 is regeneratively driven, generating power. At this time, the power generated in the electric motor 4 may be stored in the battery 6 or may directly be supplied to the inboard load.

Moreover, as shown in FIG. 1, the marine hybrid system 1 includes various sensors for monitoring the states of the constituent elements, respectively. More specifically, the marine hybrid system 1 includes a boost pressure sensor 52 for detecting a boost pressure of a supercharger (not shown) of the engine 2, a rotation speed sensor 54 for detecting a rotation speed of the engine 2, a battery state of charge sensor 56 for detecting a State of Charge (SOC) of the battery 6, a degree of battery deterioration sensor 58 for detecting the degree of deterioration of the battery 6, a lever opening degree sensor 60 for detecting an opening degree of a throttle lever to be operated when a user performs throttle control on the engine 2, a GPS sensor 62 for detecting positional information of the ship, a wind direction sensor 64 for detecting a wind direction, and a tide sensor 66 for detecting a tide. These various sensors are connected to the control device 25 via a communication line and in the control device 25, it is possible to perform control based on detection results acquired from the respective sensors.

Figure 4:
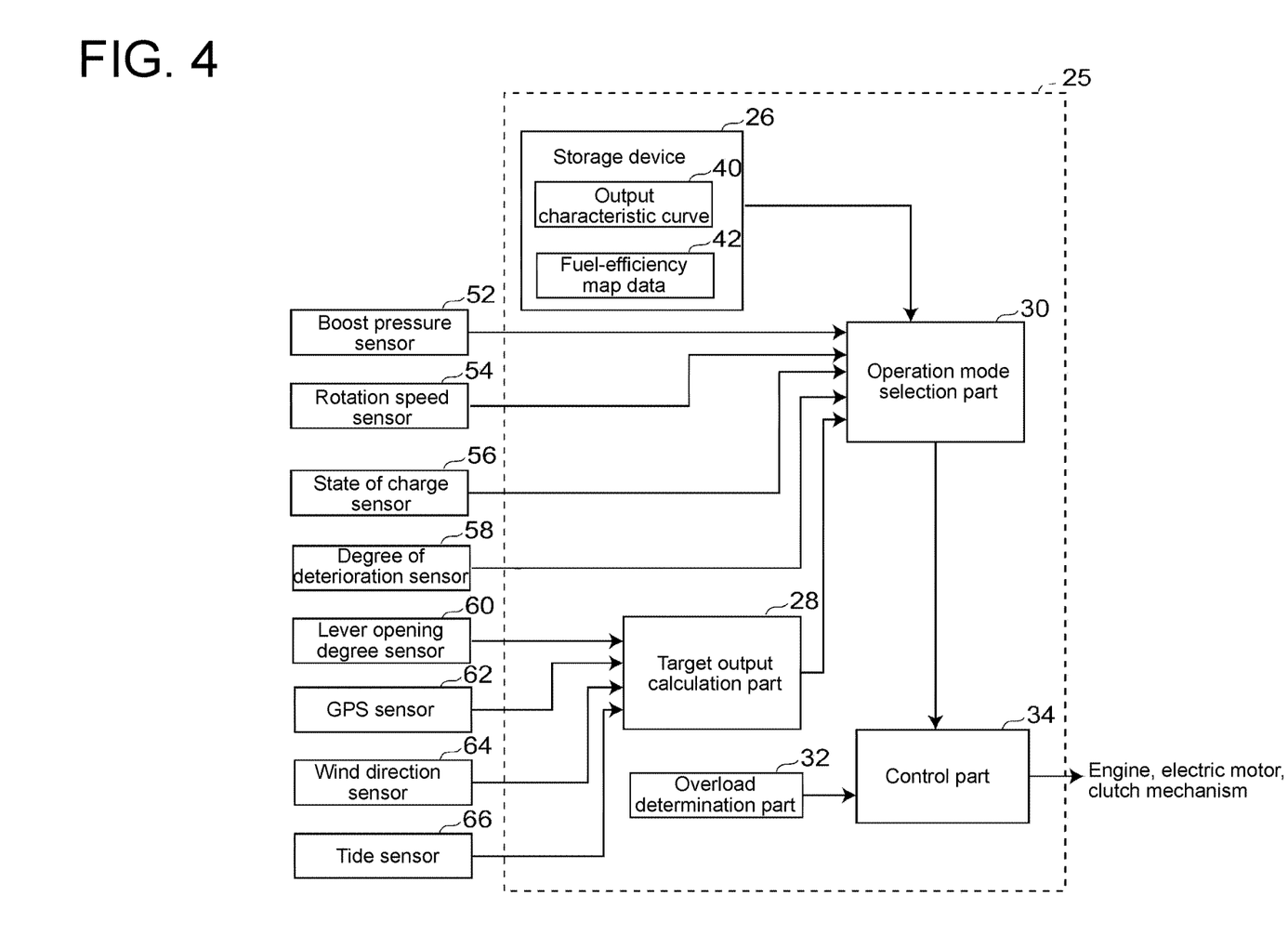
FIG. 4 is a block diagram showing the internal configuration of a control device in FIG. 1, together with a peripheral configuration.

FIG. 4 is a block diagram showing an interior configuration of the control device 25 in FIG. 1, together with a peripheral configuration. FIG. 5 is a flowchart showing steps of the control method for the marine hybrid system 1 according to at least one embodiment of the present invention.

As shown in FIG. 4, the control device 25 includes a storage device 26 for storing various kinds of data needed to perform the control method to be described below, in particular, an output characteristic curve 40 of the thrust generation device 8 in each operation mode and fuel-efficiency map data 42 of the engine 2, a target output calculation part 28 for calculating a target output based on an operation state, an operation mode selection part 30 for selecting the operation mode of the marine hybrid system 1, an overload determination part 32 for determining whether the engine 2 is in an overload condition, and a control part 34 for controlling the marine hybrid system 1 based on the operation mode selected by the operation mode selection part 30 and a determination result of the overload determination part 32. These interior configurations of the control device 25 may be integrated or further divided.

In the control method for the marine hybrid system 1, first, the control device 25 accesses the storage device 26, acquiring the output characteristic curve 40 of the thrust generation device 8 in each operation mode and the fuel-efficiency map data 42 of the engine 2 stored in the storage device 26 (step S1).

Figure 6:
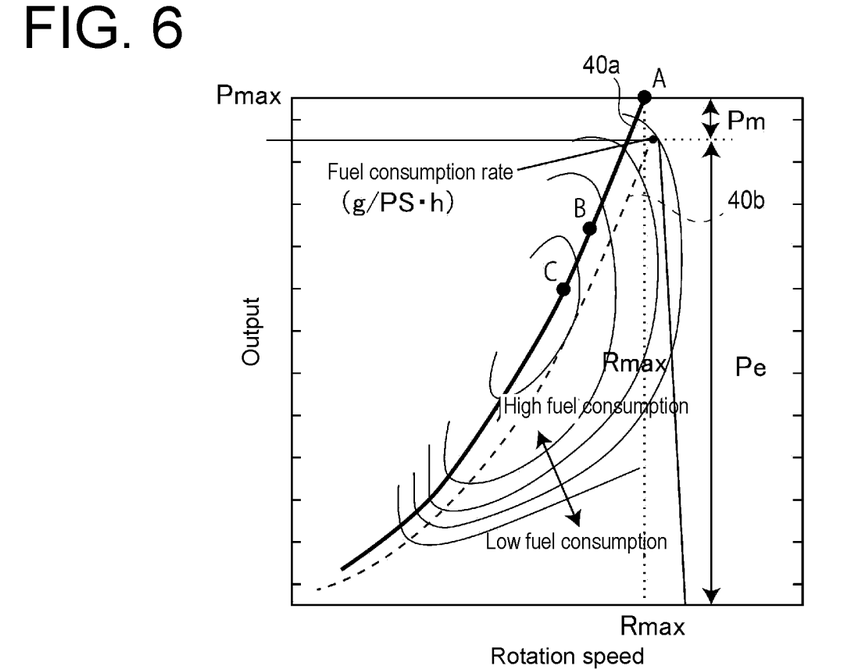
FIG. 6 is a graph showing an output characteristic curve of the engine in a motor assist mode superimposed with fuel-efficiency map data of the engine.
Figure 7:
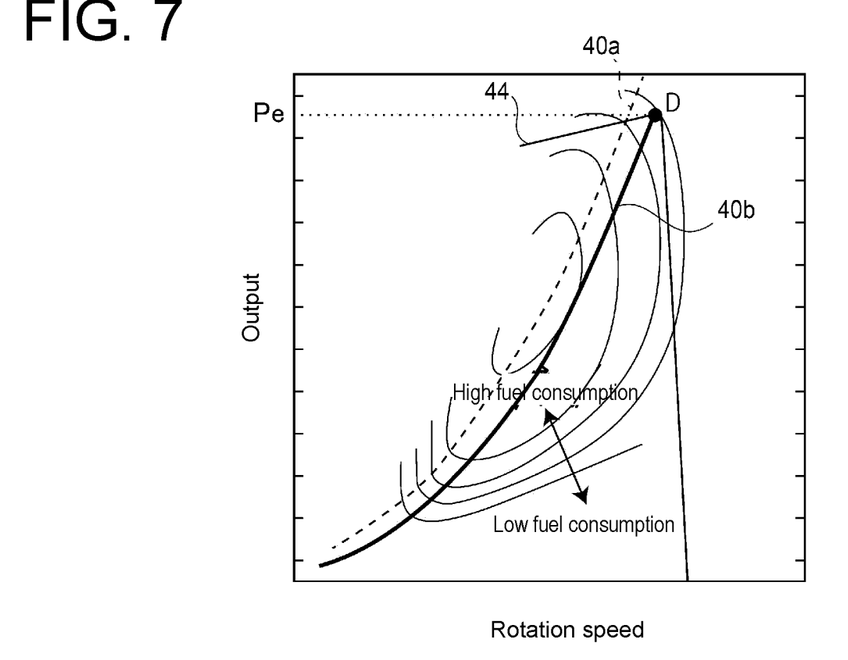
FIG. 7 is a graph showing an output characteristic curve of the engine in an engine drive mode superimposed with the fuel-efficiency map data of the engine.
Figure 8:
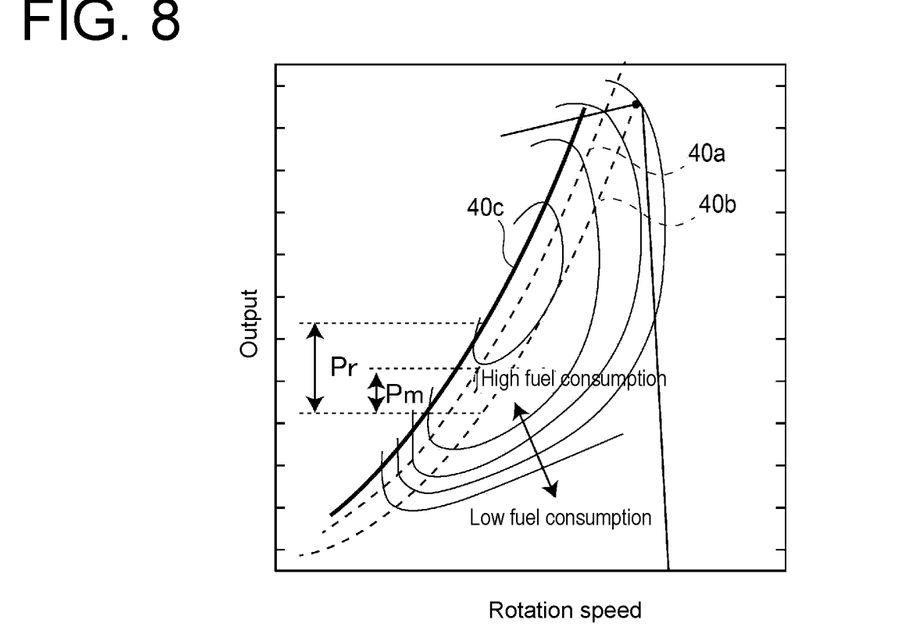
FIG. 8 is a graph showing an output characteristic curve of the engine in a sailing power generation mode superimposed with the fuel-efficiency map data of the engine.

The storage device 26 stores the various kinds of data needed to perform the present control method, in particular, the output characteristic curve 40 of the thrust generation device 8 in each operation mode and the fuel-efficiency map data 42 of the engine 2. The output characteristic curve 40 defines rotation speed-output characteristics related to the thrust generation device 8 for each operation mode. The fuel-efficiency map data 42 defines a fuel consumption amount of the engine 2 relative to an operation parameter. FIGS. 6 to 8 are graphs showing the output characteristic curve 40 of the engine 2 in the motor assist mode, the engine drive mode, and the sailing power generation mode superimposed with the fuel-efficiency map data 42 of the engine 2.

First, focusing on an output characteristic curve 40a in the motor assist mode shown in FIG. 6, in the motor assist mode, since both of the engine 2 and the electric motor 4 are used as the power sources, respectively, a maximum output Pmax is obtained at a maximum rotation speed Rmax (see an operation state A). That is, the maximum output Pmax is equal to addition of a maximum output Pm of the electric motor 4 to a maximum output Pe of the engine 2. Moreover, the thrust generation device 8 of the ship is the propeller having a predetermined specification as described above, and the shape of the output characteristic curve is defined by a cubic curve uniformly decided in accordance with a specification thereof. That is, the output characteristic curve 40a in the motor assist mode shown in FIG. 6 is decided such that the cubic curve passes through the operation state A.

In FIG. 6, the fuel-efficiency map data 42 of the engine 2 is indicated by contour lines to be superimposed with the output characteristic curve 40a in the motor assist mode. Thus, it is found that a fuel consumption rate is changed by transition of the operation state on the output characteristic curve 40a. More specifically, FIG. 6 shows that, for example, the fuel consumption rate of the engine 2 is higher in an operation state C than in operation state B.

In FIG. 6, an output characteristic curve 40b of the engine 2 alone is indicated by a dashed line, for reference.

Subsequently, focusing on the output characteristic curve 40b in the engine drive mode shown in FIG. 7, in the engine drive mode, since only the engine 2 is used as the power source, the output characteristic curve 40b in the engine drive mode has a shape shifted to a low output side by the output of the electric motor 4, compared with the output characteristic curve 40a in the motor assist mode of FIG. 6 (in FIG. 7, the output characteristic curve 40a in the motor assist mode is indicated by the dashed line, for comparison). Moreover, the output characteristic curve 40b in the engine drive mode has the maximum output Pe at an intersection D with an output upper limit line 44 defining an operable range of the engine 2.

Subsequently, focusing on an output characteristic curve 40c in the sailing power generation mode shown in FIG. 8, in the sailing power generation mode, although only the engine 2 is used as the power source, both of the electric motor 4 and the thrust generation device 8 are connected to a load side. Thus, the output characteristics shown in FIG. 8 are addition of a power generation load Pr caused in regenerative drive of the electric motor 4 to the output characteristic curve 40b in the engine drive mode described above with reference to FIG. 7 (in FIG. 8, the output characteristic curve 40a in the motor assist mode and the output characteristic curve 40b in the engine drive mode are indicated by dotted lines, respectively, for comparison).

Next, the target output calculation part 28 acquires actual measured values of the boost pressure and the rotation speed, respectively, as the operation state of the ship (step S2), and calculates the target output of the ship based on the respective actual measured values of the boost pressure and the rotation speed (step S3). More specifically, the actual measured values of the boost pressure and the rotation speed are acquired by causing the control device 25 to access the boost pressure sensor 52 and the rotation speed sensor 54, respectively. The target output is calculated such that, for example, a target thrust by the propeller which corresponds to the lever opening degree detected by the lever opening degree sensor 60 is obtained, and an optimum output ratio of the engine 2 and the motor is obtained. At this time, a computation expression for calculating the target output may include correction calculation by the wind direction detected by the wind direction sensor 64 and the tide detected by the tide sensor 66.

Subsequently, the operation mode selection part 30 applies the target output calculated in step S3 to the output characteristic curve 40 corresponding to each operation mode acquired in step S1, thereby obtaining an estimated value of the fuel consumption rate in each operation mode (step S4). That is, based on the output characteristic curve 40 in the operation mode shown in each of FIGS. 6 to 8, the fuel consumption rate assumed if the operation is performed in each operation mode is estimated.

Then, the operation mode selection part 30 compares the estimated values of the fuel consumption rate in the respective operation modes obtained in step S4, thereby selecting the operation mode with the highest fuel consumption rate (step S5). Thus, it is possible to select the operation mode capable of implementing the good fuel consumption rate in accordance with the operation condition, even if there are the plurality of operation modes.

Step S5 of the present embodiment illustrates the case in which the operation mode is selected based on the fuel consumption rate when sailing with an emphasis on the fuel consumption rate is done. However, for example, an operation mode giving priority to a sailing speed may be selected, or an operation mode giving priority to ensuring the state of charge of the battery 6 may be selected. Thus, a selection criteria of the operation mode may be set in accordance with the sailing condition. In this case, the selection criteria of the operation mode may be changeable in accordance with entry of the operator.

Subsequently, the control device 25 determines whether the operation mode selected in step S5 is the sailing power generation mode (step S6). If the operation mode is the sailing power generation mode (step S6: YES), the overload determination part 32 determines whether the engine 2 is in the overload condition (step S7).

As mentioned above with reference to FIG. 8, in the sailing power generation mode, the power output from the engine 2 is used to drive the thrust generation device 8 and to regeneratively drive the electric motor 4. If the load Pr by regenerative drive of the electric motor 4 is larger than the drive load Pm of the electric motor 4 in the motor assist mode, the engine 2 may be brought into the overload condition. That is, as shown in FIG. 8, if the power generation load of the electric motor 4 is larger than a predetermined value (the maximum output of the electric motor 4 in power drive), the output characteristic curve 40c in the sailing power generation mode is positioned on a high output side, relative to the output characteristic curve 40a in the motor assist mode. This means that the load which exceeds the output characteristics in the motor assist mode defining the maximum output is imposed on the engine 2, and the engine 2 is in the overload condition. Thus bringing the engine 2 into the overload condition, various defects such as excessive wear, oil deterioration, and seizure are carried, and a failure may be caused if the defects further advance.

Thus, if it is determined that the engine 2 is in the overload condition in the sailing power generation mode (step S7: YES), the control part 34 controls the clutch mechanism 10 to change the power path in the second clutches 16 from the first path 16a to the second path 16b (step S8). That is, switching the power path from the first path 16a on the low gear side to the second path 16b on the high gear side, the load of the engine 2 is reduced, eliminating the overload condition.

Figure 5:
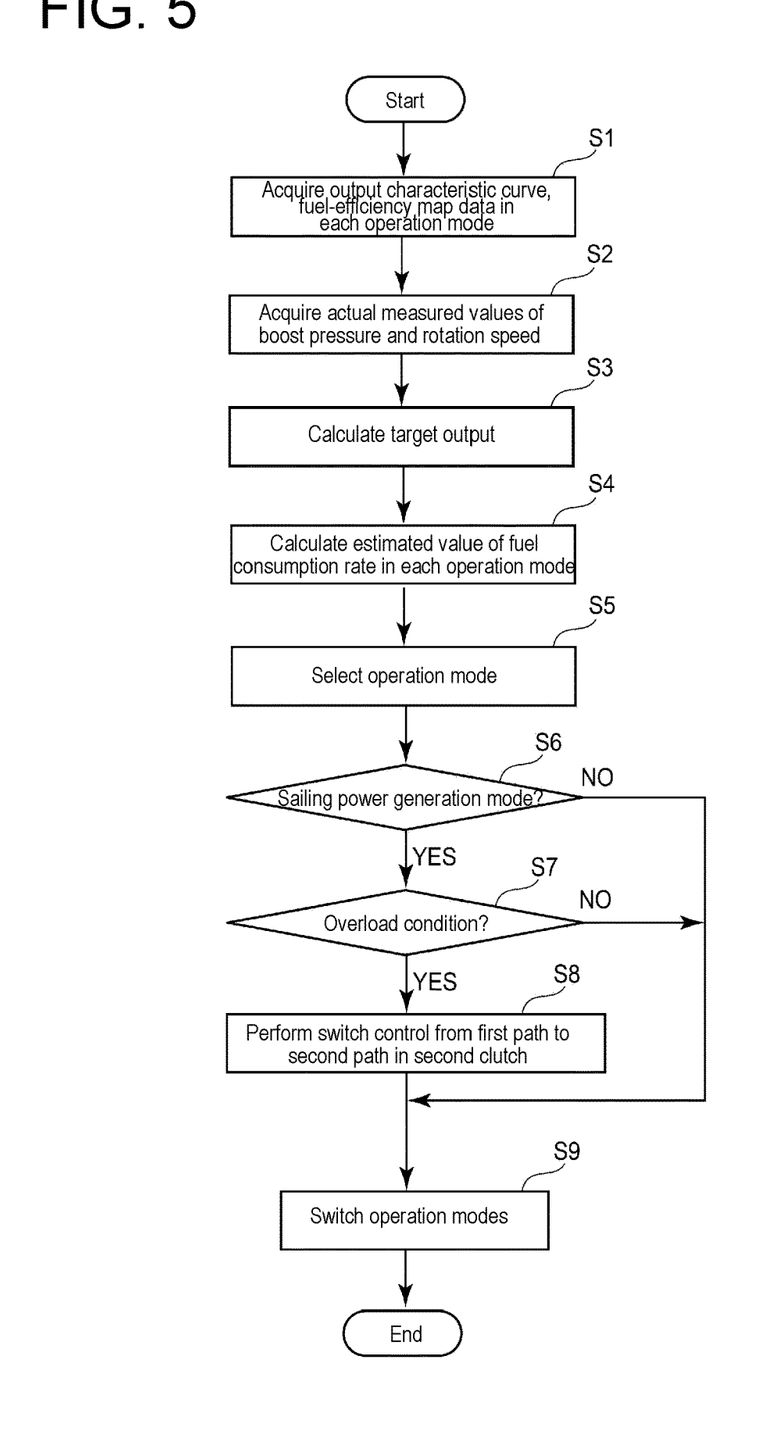
FIG. 5 is a flowchart showing steps of a control method for the marine hybrid system according to at least one embodiment of the present invention.
Figure 9:
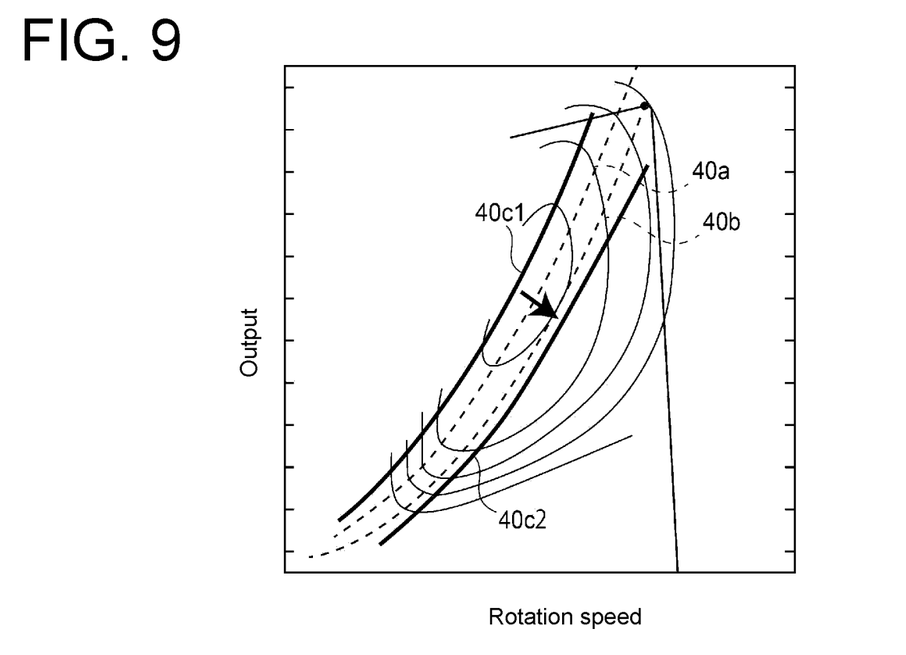
FIG. 9 is a graph showing a change in output characteristics by switching of a power path in the second clutches in step S8 of FIG. 5.

FIG. 9 is a graph showing a change in output characteristics by switching of the power path in the second clutches 16 in step S8 of FIG. 5. FIG. 9 shows an output characteristic curve 40c1 in the case in which the first path 16a is selected in the second clutches 16, and a state in which the output characteristic curve 40c1 shifts to an output characteristic curve 40c2 if the power path is changed from the first path 16a to the second path 16b in the second clutches 16 in step S8. It is found that the second path 16b is set to have the transmission ratio lower than that of the first path 16a, and thus shifts to the low output side.

In the second clutches 16, set in the connected state by the control device 25, although the first path 16a having the higher transmission ratio is selected as default, the power path is switched to the second path 16b if it is determined in step S8 that the engine 2 is in the overload condition. Consequently, an output characteristic curve 40a1 is shifted to the low output side and changed to an output characteristic curve 40a2. With a decrease in transmission ratio, the output characteristic curve 40a2 moves to the low output side relative to the output characteristic curve 40a in the motor assist mode, eliminating the overload condition.

As described above, according to the present embodiment, controlling the clutch mechanism such that the load of the engine is reduced, if it is determined that the engine is in the overload condition, it is possible to adequately prevent the engine from being brought into the overload condition. As a result, it is possible to implement the marine hybrid system capable of stable operation with high reliability.

INDUSTRIAL APPLICABILITY

At least one embodiment of the present invention is available for a marine hybrid system that can be equipped with a hybrid propulsion ship including an engine and an electric motor as power sources, and a control method for the marine hybrid system.

REFERENCE SIGNS LIST

1 Marine hybrid system
2 Engine
4 Electric motor
6 Battery
8 Thrust generation device
10 Clutch mechanism
14 First clutch
16 Second clutch
18 Third clutch
19 Transmission mechanism
25 Control device
26 Storage device
28 Target output calculation part
30 Operation mode selection part
32 Overload determination part
34 Control part
40 Output characteristic curve
42 Fuel-efficiency map data
44 Output upper limit line
52 Boost pressure sensor
54 Rotation speed sensor
56 Battery state of charge sensor
58 Degree of battery deterioration sensor
60 Lever opening degree sensor
62 GPS sensor
64 Wind direction sensor
66 Tide sensor

The invention claimed is:

1. A marine hybrid system, comprising:
an engine;
an electric motor;
a thrust generation device capable of generating a thrust of a ship by using an output of at least one of the engine or the electric motor;
a clutch mechanism configured to be able to switch connection states between the engine, the electric motor, and the thrust generation device;
an overpower determination part for determining whether the engine is in an overload condition; and
a control device for controlling a connection state of the clutch mechanism,
wherein the clutch mechanism is configured that transmission ratios between the engine and the thrust generation device is variable,
wherein the control device controls the clutch mechanism such that a load of the engine is reduced by decreasing the transmission ratios, if the overload determination part determines that the engine is in the overload condition.

2. The marine hybrid system according to claim 1, wherein the overload determination part determines whether the engine is in the overload condition in a sailing power generation mode where power is generated by the electric motor during sailing by supplying the output of the engine to the thrust generation device and the electric motor.

3. The marine hybrid system according to claim 1, wherein the clutch mechanism includes:
a first clutch disposed between the thrust generation device and an intermediate shaft;
second clutches disposed between the intermediate shaft and the engine; and
a third clutch disposed between the intermediate shaft and the drive motor,
wherein the second clutches are disposed in parallel, and include a power transmission path including a first path and a second path different from each other in transmission ratio, and
wherein the control device is configured to be able to adjust the load of the engine by alternatively switching the first path or the second path, if the second clutches are connected.

4. The marine hybrid system according to claim 3,
wherein the second path is set to have the transmission ratio lower than that of the first path, and
wherein the control device controls the clutch mechanism such that the power transmission path of the second clutches is switched from the first path to the second path, if the overload determination part determines that the internal combustion engine is in the overload condition.

5. The marine hybrid system according to claim 1,
wherein the ship has a plurality of operation modes,
wherein the plurality of operation modes include:
an engine drive mode in which the ship sails by power of the engine;
a motor drive mode in which the ship sails by power of the electric motor;
a motor assist mode in which the ship sails by power of both of the engine and the electric motor;
a sailing power generation mode in which power is generated by the electric motor while the ship sails by the power of the engine; and
a stop power generation mode in which power is generated by the electric motor while the thrust power generation device is stopped, and
wherein the control device controls the clutch mechanism such that the load of the engine is reduced, if the overload determination part determines that the engine is in the overload condition, in the sailing power generation mode of the operation modes.

6. The marine hybrid system according to claim 5, further comprising:
a storage device for storing an output characteristic curve defining a relationship between a rotation speed and an output of the thrust generation device in each of the plurality of operation modes, and fuel-efficiency map data of the engine;
a target output calculation part for calculating a target output of the thrust generation device; and
an operation mode selection part for calculating, based on the output characteristic curve and fuel map data, a fuel consumption rate in each of the operation modes corresponding to the target output, and selecting, based on the fuel consumption rate in each of the operation modes, the operation mode to be implemented.

7. The marine hybrid system according to claim 1,
wherein the engine is a mechanical engine capable of controlling a rotation speed by a throttle operation of an operator.

8. A control method for a marine hybrid system which includes:
an engine;
an electric motor;
a thrust generation device capable of generating a thrust of a ship by using an output of at least one of the engine or the electric motor; and
a clutch mechanism configured to be able to switch connection states between the engine, the electric motor, and the thrust generation device,
wherein the clutch mechanism is configured that transmission ratios between the engine and the thrust generation device is variable, the method comprising:
an overload determination step of determining whether the engine is in an overload condition; and
a control step of controlling the clutch mechanism such that a load of the engine is reduced by decreasing the transmission ratios, if it is determined that the engine is in the overload condition.

9. The control method for the marine hybrid system according to claim 8,
wherein the control step includes determining whether the engine is in the overload condition in a sailing power generation mode where power is generated by the electric motor during sailing by supplying the output of the engine to the thrust generation device and the electric motor.

* * * * *